Patented Apr. 27, 1948

2,440,303

UNITED STATES PATENT OFFICE 2,440,303

INCREASING THE RESISTANCE OF RED PHOSPHORUS TO OXIDATION

Martin S. Silverstein, Camden, N. J.

No Drawing. Application September 8, 1941,
Serial No. 410,055

4 Claims. (Cl. 23—223)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to red phosphorus and in particular to a method of treating the same to inhibit oxidation processes.

It has been proposed to use red phosphorus in small arms primer compositions mixed with such substances as barium nitrate, antimony sulfide and lead peroxide. Such primer compositions have been found to offer the advantages of giving uniform ballistic results as well as being non-corrosive. Red phosphorus is also extensively used for match heads as well as in striking surfaces for matches.

However, when compounded with oxidizing agents the phosphorus is exposed to increased oxidation effects. During such oxidation there is produced a liquid which is probably an aqueous solution of phosphorous acids and probably, ultimately, phosphoric acid. It is the presence of this liquid which is disadvantageous to the aforementioned uses of red phosphorus in that it renders the phosphorus more difficult to ignite.

The present invention has to do with a method for retarding this oxidation process. The method comprises the addition to the red phosphorus of either a solid aliphatic alcohol or a solid phenol containing one or more hydroxyl groups in their molecular structure. For example, one variation of the method comprises adding to red phosphorus 5% of its weight of mannitol in the form of a 5% aqueous solution. The mixture is well blended and is dried in a vacuum and is then ready for use.

Typical of the solid aliphatic alcohols that may be used in practicing the invention are erythritol, arabitol, mannitol and sorbitol and aldols such as dextrose. Inositol or hexahydroxycyclohexane is typical of the cycloaliphatic compounds which may be used. Suitable aromatic compounds which may be used include, phenol, cresol, resorcinol and phloroglucinol.

In general, those compounds in which the hydroxy groups form a large percentage of the molecule and which are non-volatile are preferred. Thus among the best results have been obtained with mannitol, dextrose and phloroglucinol.

By the use of organic compounds whose structure contains one or more hydroxyl groups it has been possible to reduce the oxidation of red phosphorus by amounts ranging from 39% to 92% of its original value.

While certain uses of red phosphorus have been enumerated and a specific method of treatment described, it is to be understood that the invention is not intended to be limited thereby, but only within the scope of the appended claims, since other uses and specific methods will be readily apparent to those skilled in the art.

It has also been found that red phosphorus oxidizes to an undesirable degree even in the absence of added oxidizing agents. The present invention is therefore useful regardless of whether the red phosphorus is to be compounded with other agents or used per se.

I claim:

1. A method for rendering red phosphorus resistant to oxidation which comprises adding a small amount of mannitol to the phosphorus.

2. A method for rendering red phosphorus resistant to oxidation which comprises adding to the phosphorus approximately 5% of its weight of mannitol in the form of an approximately 5% aqueous solution and drying the product.

3. A substantially dry oxidation resistant composition comprising red phosphorus and a small quantity of mannitol.

4. A substantially dry oxidation resistant composition comprising red phosphorus and approximately 5% of its weight of mannitol.

MARTIN S. SILVERSTEIN.

REFERENCES CITED

The following references are of record in the file of this patent:

UNITED STATES PATENTS

| Number | Name | Date |
|---|---|---|
| 592,227 | Aronson | Oct. 26, 1897 |

FOREIGN PATENTS

| Number | Country | Date |
|---|---|---|
| 6,818 | Great Britain | 1899 |

OTHER REFERENCES

Mellor, Inorganic and Theoretical Chemistry, vol. 8, page 790, Longmans, Green & Co., New York, (1928).

Kausch, Phosphor, Phosphorsaure and Phosphate, pages 31, 37, Berlin (1929).

Eynon et al., "Starch," Heffer & Sons, Cambridge, page 197 (1928).

Webster's New International Dictionary, Second edition (1941), page 1067.